US009819168B2

(12) United States Patent
Shiraki

(10) Patent No.: US 9,819,168 B2
(45) Date of Patent: Nov. 14, 2017

(54) ELECTRICAL JUNCTION BOX

(71) Applicant: Sumitomo Wiring Systems, Ltd., Yokkaichi, Mie (JP)

(72) Inventor: Takashi Shiraki, Mie (JP)

(73) Assignee: Sumitomo Wiring Systems, Ltd., Yokkaichi, Mie (JP)

(*) Notice: Subject to any disclaimer, the term of this patent is extended or adjusted under 35 U.S.C. 154(b) by 0 days.

(21) Appl. No.: 15/327,853

(22) PCT Filed: Jul. 2, 2015

(86) PCT No.: PCT/JP2015/069183
§ 371 (c)(1),
(2) Date: Jan. 20, 2017

(87) PCT Pub. No.: WO2016/013374
PCT Pub. Date: Jan. 28, 2016

(65) Prior Publication Data
US 2017/0207614 A1    Jul. 20, 2017

(30) Foreign Application Priority Data

Jul. 23, 2014  (JP) .................................. 2014-150181

(51) Int. Cl.
H02G 3/14       (2006.01)
H02G 3/08       (2006.01)
(52) U.S. Cl.
CPC ............. *H02G 3/14* (2013.01); *H02G 3/081* (2013.01); *H02G 3/088* (2013.01)
(58) Field of Classification Search
CPC ........... H02G 3/14; H02G 3/081; H02G 3/088
See application file for complete search history.

(56) References Cited

U.S. PATENT DOCUMENTS

| 4,254,903 A * | 3/1981 | Kuehlhorn | B65D 5/106 229/125.26 |
| 2010/0127012 A1 | 5/2010 | Takeuchi | |
| 2013/0032371 A1 | 2/2013 | Makino | |

FOREIGN PATENT DOCUMENTS

| JP | 2000004521 A | 1/2000 |
| JP | 2010130705 A | 6/2010 |
| JP | 2013034320 A | 2/2013 |

OTHER PUBLICATIONS

International Search Report and Written Opinion for Application No. PCT/JP2015/069183, 6 pages.
English Translation of International Search Report for Application No. PCT/JP2015/069183, 1 page.

* cited by examiner

*Primary Examiner* — Dhirubhai R Patel
(74) *Attorney, Agent, or Firm* — Reising Ethington, P.C.

(57) ABSTRACT

An electrical junction box in which the interference between an inner wall of a rotating upper cover and an outer wall of a box body can be more reliably prevented and a waterproof property can be secured, while also meeting the demand for reduction in size of the electrical junction box. In a state in which an upper cover is attached to a box body, on one end side of the box body and one end side of the upper cover, an outer wall of the box body is located on an inner side with respect to an outer wall of the upper cover, an inner wall of the upper cover is located on an inner side with respect to the outer wall of the box body, and an inner wall of the box body is located on an inner side with respect to the inner wall of the upper cover.

2 Claims, 6 Drawing Sheets

ELECTRICAL JUNCTION BOX

CROSS REFERENCE TO RELATED APPLICATIONS

This application claims the priority of Japanese patent application JP2014-150181 filed on Jul. 23, 2014, the entire contents of which are incorporated herein.

TECHNICAL FIELD

The present invention relates to an electrical junction box to be mounted in an automobile or the like, and particularly to an electrical junction box having a waterproof structure with which infiltration of water from the outside is prevented.

BACKGROUND ART

Conventionally, electrical junction boxes to be mounted in automobiles and the like are configured to include a box body that has a peripheral wall formed in a frame shape and keeps electric parts such as a relay, a fuse, and an electric wire installed inside the peripheral wall, and lid bodies such as an upper cover and a lower cover with which opening portions on the upper and lower sides of the box body are covered. For example, electrical junction boxes are configured as disclosed in JP 2013-34320A (Patent Document 1).

In Patent Document 1, double wall portions, in which an inner wall and an outer wall extending in a peripheral direction are arranged with a clearance therebetween, are provided at the upper end portion of the peripheral wall of the box body and the lower opening end portion of the upper cover. The outer wall in the double wall portion of the box body is inserted between the inner wall and the outer wall in the double wall portion of the upper cover, and thus the upper opening portion of the box body is covered with the upper cover. Accordingly, even when the electrical junction box mounted in a vehicle is splashed with water, a route through which the water infiltrates from the outside into the inside of the electrical junction box becomes complicated due to the double wall portions of the upper cover and the box body overlapping each other, and therefore, the water is advantageously prevented from infiltrating into the inside of the electrical junction box through the portion where the upper cover and the box body are fitted to each other.

In addition, in the electrical junction boxes having such a conventional structure, as clearly shown in FIGS. 5 and 6 in Patent Document 1, a structure is widely used in which the upper cover is attached to the box body by engaging an engaging portion provided to one end of the upper cover with an engaged portion provided on one end of the box body and rotating the upper cover with the engaging portion serving as the rotation center. Accordingly, when attaching the upper cover to the box body, it is not necessary to precisely position the double wall portions of the upper cover and the box body over the entire length in the peripheral direction. Therefore, the upper cover can be easily attached to the box body, resulting in a shortening of the operation time and a reduction in manufacturing cost. In particular, in order to prevent the inner wall at one end of the upper cover from interfering with the outer wall of the box body during the rotation of the upper cover, an idea has been introduced in which the inner wall of the upper cover is formed such that a clearance is formed between the one end thereof and the outer wall of the box body.

However, the clearance between the engaging portion of the upper cover and the engaged portion of the box body, and the tolerance of the dimensions of the upper cover and the box body vary widely, and therefore, it is necessary to ensure a sufficiently large clearance between the one end of the inner wall of the upper cover and the outer wall of the box body in order to prevent the interference between the inner wall of the upper cover and the outer wall of the box body. With such a conventional structure, the size of the electrical junction box is inevitably increased, and there are cases where recent demand for the reduction in size of the electrical junction box cannot be met.

SUMMARY OF INVENTION

The present design has been achieved in light of the aforementioned circumstances, and the problem to be solved is to provide an electrical junction box having a novel structure with which interference between the inner wall of the rotating upper cover and the outer wall of the box body can be more reliably prevented and a waterproof property can be secured, while also meeting the demand for the reduction in size of the electrical junction box.

A first aspect of the present design is an electrical junction box including a box body having a peripheral wall formed in a frame shape, and an upper cover with which an upper opening portion of the box body is covered, an upper end portion of the peripheral wall of the box body and an opening end portion of the upper cover being provided with double wall portions in which an inner wall and an outer wall extending in a peripheral direction are arranged with a clearance therebetween, the upper cover being attached to the box body by engaging an engaging portion provided on one end of the upper cover with an engaged portion provided on one end of the box body and rotating the upper cover with the engaging portion serving as a rotation center, wherein, in a state in which the upper cover is attached to the box body, on the one end side of the box body and the one end side of the upper cover, the outer wall of the box body is located on an inner side with respect to the outer wall of the upper cover, the inner wall of the upper cover is located on an inner side with respect to the outer wall of the box body, and the inner wall of the box body is located on an inner side with respect to the inner wall of the upper cover, and a position of a projecting end surface of the inner wall of the upper cover is set to be as high as or higher than a position of a projecting end surface of the outer wall of the box body, and a position of a projecting end surface of the inner wall of the box body is set to be higher than the position of the projecting end surface of the inner wall of the upper cover.

With this aspect, in the state in which the upper cover is attached to the box body, on the one end side of the box body and the one end side of the upper cover, the position of the projecting end surface of the inner wall of the upper cover is set to be as high as or higher than the position of the projecting end surface of the outer wall of the box body. Accordingly, when the upper cover is rotated with the engaging portion of the upper cover serving as the rotation center, the interference between the one end of the inner wall of the upper cover and the outer wall of the box body can be reliably prevented. Therefore, it is possible to suppress the expansion of the electrical junction box toward the outer peripheral side to avoid the increase in size of the electrical junction box compared with a conventional structure in which a large clearance is secured between the outer wall of the box body and the inner wall of the upper cover on the one end side to prevent the interference.

Furthermore, the position of the projecting end surface of the inner wall of the box body is set to be higher than the position of the projecting end surface of the inner wall of the upper cover. Accordingly, water that has passed the inner wall of the upper cover and infiltrated into the inside can be prevented from passing the inner wall of the box body and infiltrating into the inside, and thus the waterproof property of the electrical junction box is improved more advantageously.

In addition, the position of the projecting end surface of the inner wall of the box body is higher than the position of the projecting end surface of the outer wall of the box body, and therefore, even when water infiltrates through the clearance between the outer wall of the upper cover and the outer wall of the box body, the water is advantageously prevented from passing the inner wall of the box body and infiltrating into the inside of the electrical junction box. As a result, the water flows down along the outer surface of the inner wall of the box body and thus can be quickly drained to the outside. In this manner, the water can be advantageously drained to the outside, thus making it possible to reliably prevent water from infiltrating into the inside of the electrical junction box.

A second aspect of the present design is the electrical junction box according to the first aspect, wherein, in at least a portion of a region other than a region on the one end side, in the state in which the upper cover is attached to the box body, the position of the projecting end surface of the inner wall of the upper cover is set to be lower than the position of the projecting end surface of the outer wall of the box body.

With this aspect, when the upper cover is rotated and fitted to the box body, in at least a portion of the region other than the region located on the one end side where the interference between the inner wall of the upper cover and the outer wall of the box body is not problematic, the position of the projecting end surface of the inner wall of the upper cover is set to be lower than the position of the projecting end surface of the outer wall of the box body. In this region, the inner wall of the upper cover can be fitted between the outer wall and the inner wall in the double wall of the box body, and therefore, the upper opening portion of the box body can be stably covered with the upper cover.

With the electrical junction box according to the present design, in the state in which the upper cover is attached to the box body, on the one end sides of the box body and the upper cover, the position of the projecting end surface of the inner wall of the upper cover is set to be as high as or higher than the position of the projecting end surface of the outer wall of the box body. Accordingly, when the upper cover is rotated with the engaging portion of the upper cover serving as the rotation center, the interference between the one end of the inner wall of the upper cover and the outer wall of the box body can be reliably prevented. Therefore, it is possible to suppress the expansion of the electrical junction box toward the outer peripheral side to avoid the increase in size of the electrical junction box compared with the conventional structure in which a large clearance is secured between the outer wall of the box body and the inner wall of the upper cover on the one end side to prevent the interference. Furthermore, the position of the projecting end surface of the inner wall of the box body is set to be higher than the position of the projecting end surface of the inner wall of the upper cover, thus making it possible to prevent water that has passed the inner wall of the upper cover and infiltrated into the inside from passing the inner wall of the box body and infiltrating into the inside. In addition, the position of the projecting end surface of the inner wall of the box body is higher than the position of the projecting end surface of the outer wall of the box body, and therefore, even when water infiltrates through the clearance between the outer wall of the upper cover and the outer wall of the box body, the water can be advantageously prevented from passing the inner wall of the box body and infiltrating into the inside.

DESCRIPTION OF EMBODIMENTS

Figure 1:
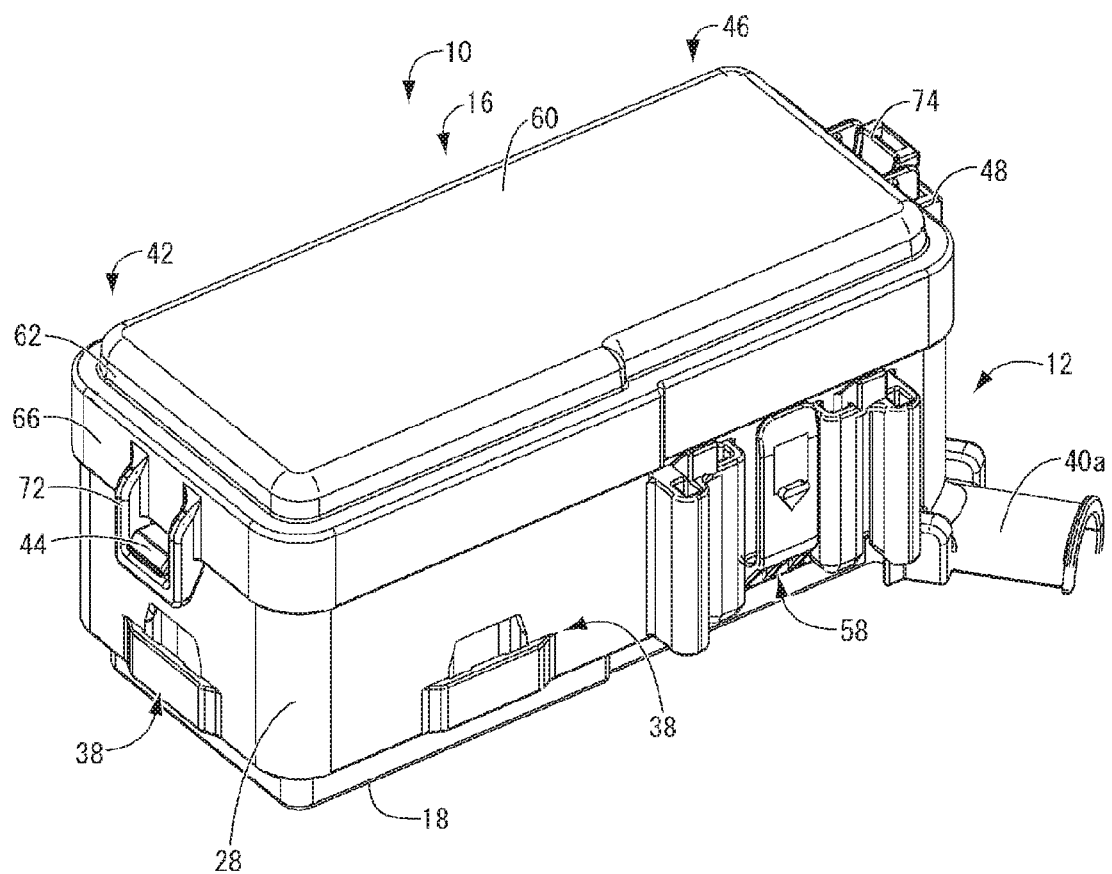
FIG. 1 is a perspective view of an electrical junction box according to an embodiment of the present design (in a state in which a box body and an upper cover are fitted to each other).

Hereinafter, an embodiment of the present invention will be described with reference to the drawings.

FIGS. 1 to 8 show an electrical junction box 10 according to an embodiment of the present design. The electrical junction box 10 is arranged at an appropriate position in a vehicle (not shown) such as an automobile and has a function for distributing electric power supplied by a battery to vehicle-mounted electrical components such as a motor and a lamp. It should be noted that the electrical junction box 10 is mounted in a vehicle such that the up-down direction in FIG. 1 corresponds to the vertical direction. In the description below, unless otherwise stated, the up-down direction refers to the up-down direction in FIG. 1, the longitudinal direction and the front-rear direction refer to the left-right direction in FIG. 4, and the width direction refers to the up-down direction in FIG. 4.

More specifically, the electrical junction box 10 is configured to include a box body 12, an upper cover 16 with which an upper opening portion 14 of the box body 12 is covered, and a lower cover (not shown) with which a lower opening portion 18 of the box body 12 is covered. The box body 12, the upper cover 16, and the lower cover are each integrally formed of a synthetic resin made of polypropylene (PP), polyamide (PA), or the like by injection molding or the like, for example.

Figure 2:
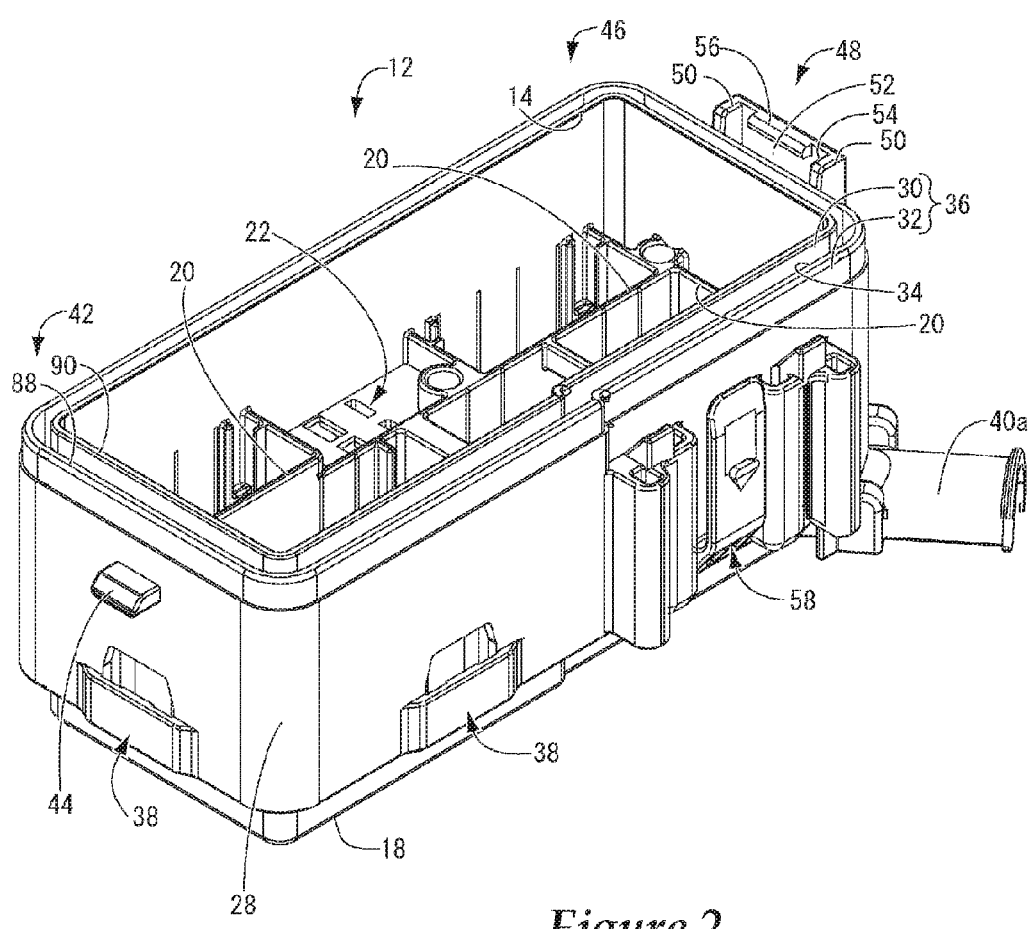
FIG. 2 is a perspective view of the box body shown in FIG. 1.

The box body 12 has an elongated rectangular frame body shape as a whole, and as shown in FIG. 2, on the upper opening portion 14 side of the box body 12, a plurality of relay block attaching portions 20 having a substantially rectangularly cylindrical shape are provided, and a plurality of connector attaching portions 22 are formed to be open upward. Relay block holding projections 24 that project inward are provided at the lower end portion of the relay block attaching portion 20 (see FIG. 5), so that the back surface of a relay block (not shown) attached to the relay block attaching portion 20 can be positioned and held. On the other hand, electric wires (not shown) connected to the relay blocks and connectors (not shown) that have been attached to the relay block attaching portions 20 and the connector attaching portions 22, respectively, are arranged on the lower opening portion 18 side of the box body 12. It should be noted that these electric wires are drawn out to the outside through a later-described electric wire leading hole and connected to the vehicle-mounted electrical components, the battery, and the like.

The box body 12 has a peripheral wall 28 formed in a frame shape, and as shown in FIG. 2, a double wall portion 36, in which an inner wall 30 and an outer wall 32 extending in a peripheral direction are arranged with a clearance 34 therebetween, is provided at the upper end portion of the peripheral wall 28 of the box body 12. On the other hand, locking portions 38 are provided at a plurality of positions that are separated in the peripheral direction at the lower end portion of the peripheral wall 28 of the box body 12. The locking portions 38 are fitted to locked portions (not shown) of the lower cover, and thus the lower opening portion 18 of the box body 12 can be maintained in a state in which the lower opening portion 18 is covered with the lower cover. In addition, an electric wire leading hole 40*a* that projects outward (toward the obliquely front side on the rear side in FIG. 2) is provided on the lower opening portion 18 of the box body 12. It should be noted that the electric wire leading hole 40*a* is formed in a semicylindrical shape that is convex upward. An electric wire leading hole having a semicylindrical shape that is convex downward and projecting outward is also provided on the lower cover (not shown) at a position corresponding to the electric wire leading hole 40*a* provided on the box body 12. Accordingly, in the state in which the box body 12 and the lower cover are fitted to each other, the electric wire leading hole 40*a* of the box body 12 and the electric wire leading hole of the lower cover are assembled into an electric wire leading hole having a cylindrical shape.

Figure 8:
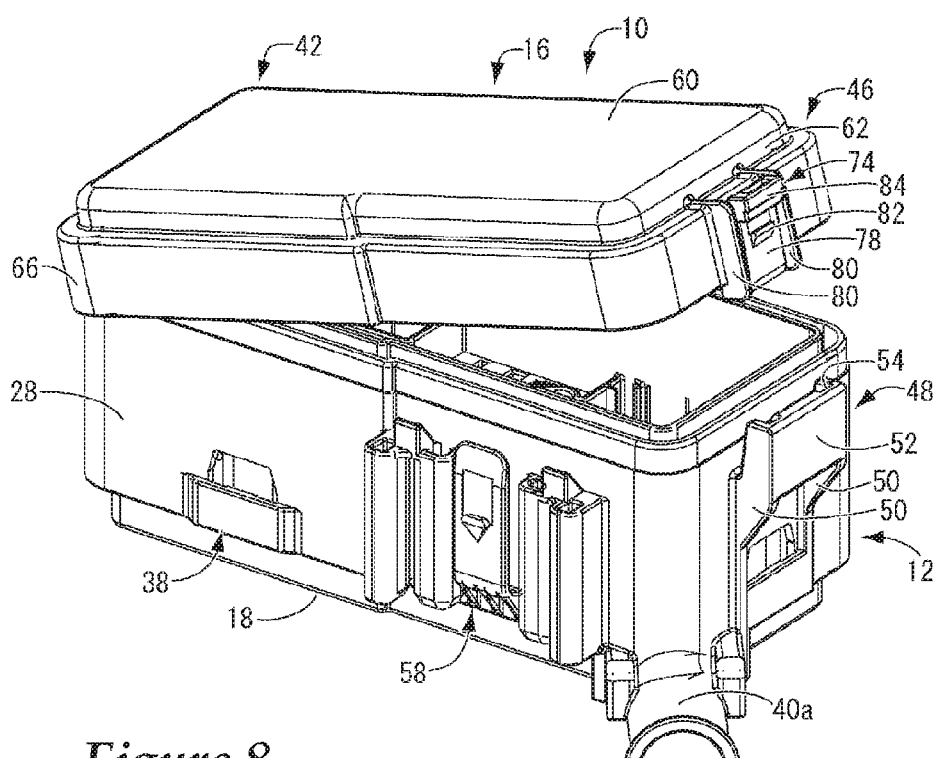
FIG. 8 is a perspective view illustrating a state in which the upper cover is being rotated and attached to the box body in the electrical junction box shown in FIG. 7.

With regard to two parts of the peripheral wall 28 that are opposed to each other in the longitudinal direction (left-right direction in FIG. 2) of the box body 12, a portion near the upper opening portion 14 of the box body 12 in one of the two parts that is located on one end side 42 is provided with an engaged portion 44 having a substantially rectangular block shape and projecting outward, and a portion near the upper opening portion 14 of the box body 12 in the other of the two parts that is located on the other end side 46 is provided with a locking portion 48. As shown in FIG. 8, the locking portion 48 includes a pair of guide portions 50 having a substantially flat plate shape and projecting outward (rearward in FIG. 8) from the upper portion of the part on the other end side 46 of the peripheral wall 28 of the box body 12 and then extend upward, and a coupling portion 52 for coupling the outer edges of the portions extending upward in the pair of guide portions 50. The locking portion 48 is a frame body substantially having a U shape in a planar view. An accommodating portion 54 is configured as a region surrounded by the pair of guide portions 50, the coupling portion 52, and the peripheral wall 28. As shown in FIG. 2, an engaging projection portion 56 that projects toward the peripheral wall 28 of the box body 12 is provided on the upper end portion of the inner surface of the coupling portion 52 opposed to the peripheral wall 28 of the box body 12 over substantially the entire length in the width direction.

Furthermore, a lock fitting portion 58 to be attached to a fixing bracket (not shown) projects from the outer peripheral surface of one (on the lower side in FIG. 4) of two parts of the peripheral wall 28 that are opposed to each other in the width direction of the box body 12, and the electrical junction box 10 is stably held at a predetermined position in a vehicle by fitting the lock fitting portion 58 to the fixing bracket (not shown).

Figure 3:
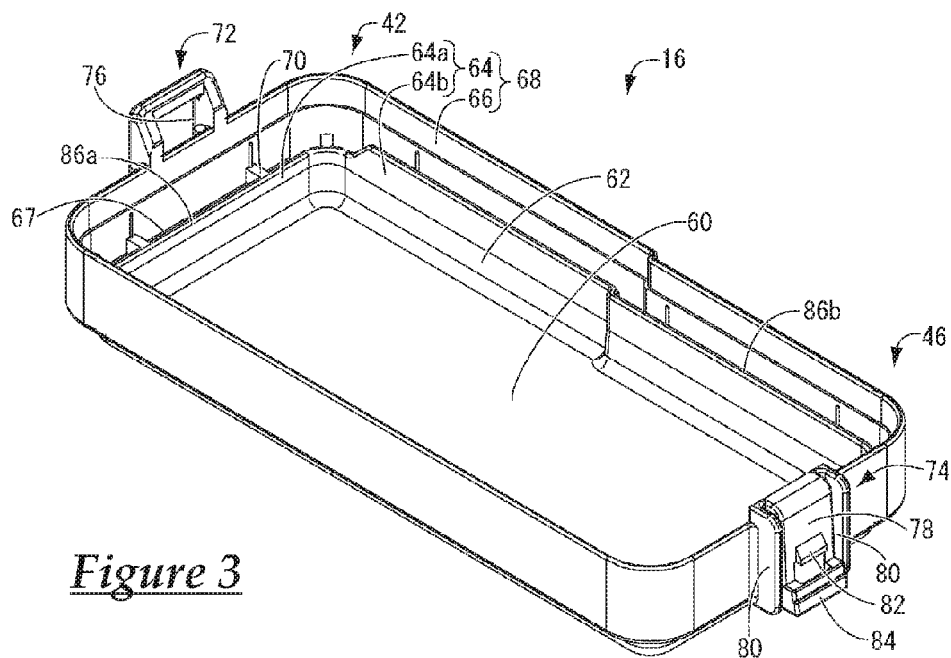
FIG. 3 is a perspective view of the upper cover shown in FIG. 1, as viewed from the lower surface side.
Figure 4:
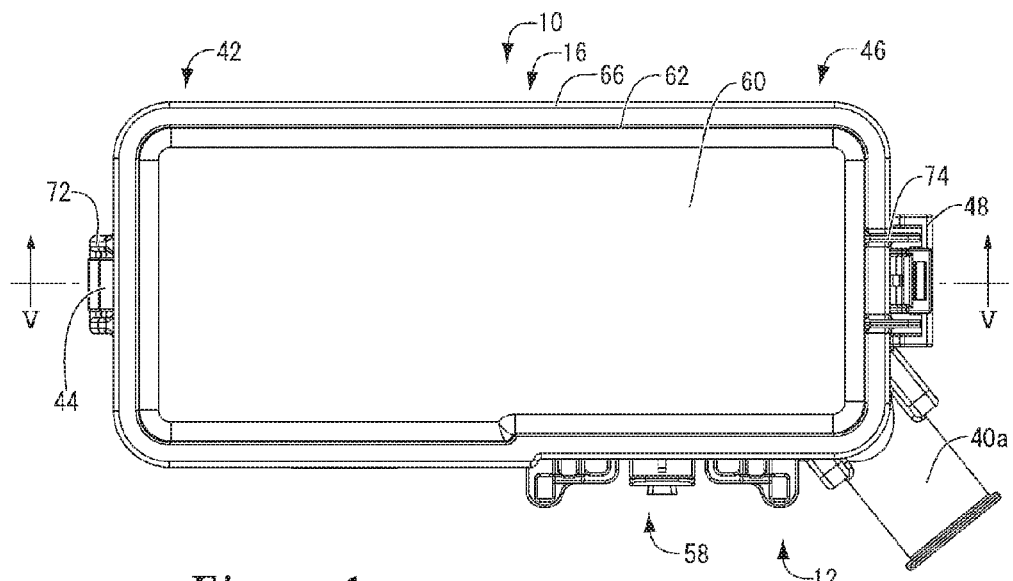
FIG. 4 is a plan view of the electrical junction box shown in FIG. 1.

The upper cover 16 has a box body shape that is open downward, and is configured to include an upper wall 60 having an elongated rectangular shape that is substantially the same as the shape of the upper opening portion 14 of the box body 12 in a planar view, and a peripheral wall 62 projecting downward from the outer peripheral edge of the upper wall 60 (see FIG. 3). A double wall portion 68, in which an inner wall 64 and an outer wall 66 extending in a peripheral direction are arranged with a clearance 67 therebetween, is provided at the opening end portion of the peripheral wall 62 of the upper cover 16, and the inner wall 64 and the outer wall 66 are integrally coupled via a coupling portion 70 provided between the inner wall 64 and the outer wall 66. It should be noted that in this embodiment, the outer wall 66 is formed to project further toward the box body 12 side than the inner wall 64 does. The inner wall 64 is constituted by an inner wall 64*a* provided on the one end side 42 and the inner wall 64*b* that is provided in a region other than the region located on the one end side 42 and formed so as to extend further toward the box body 12 side than the inner wall 64*a* does.

With regard to two parts of the peripheral wall 62 that are opposed to each other in the longitudinal direction (left-right direction in FIG. 3) of the upper cover 16, one of the two parts that is located on the one end side 42 is provided with an engaging portion 72, and the other of the two parts that is located on the other end side 46 is provided with a locked portion 74. As shown in FIGS. 1 and 3, the engaging portion 72 is a frame body that substantially has a U shape in a front view and that extends downward relative to the peripheral wall 62, and is provided with an engaging hole 76. On the other hand, as shown in FIGS. 3 and 8, the locked portion 74 includes a rectangular elastic projecting piece 78 having an L-shaped cross section that projects upward from the opening end portion of the peripheral wall 62 and has a cantilever structure, and a pair of substantially rectangular guide plate portions 80 that project from the two sides of the elastic projecting piece 78 with a clearance therebetween. An engaging projection 82 that projects outward is provided on the central portion of the elastic projecting piece 78, and a projecting end portion of the elastic projecting piece 78 serves as an engagement releasing portion 84.

Figure 5:
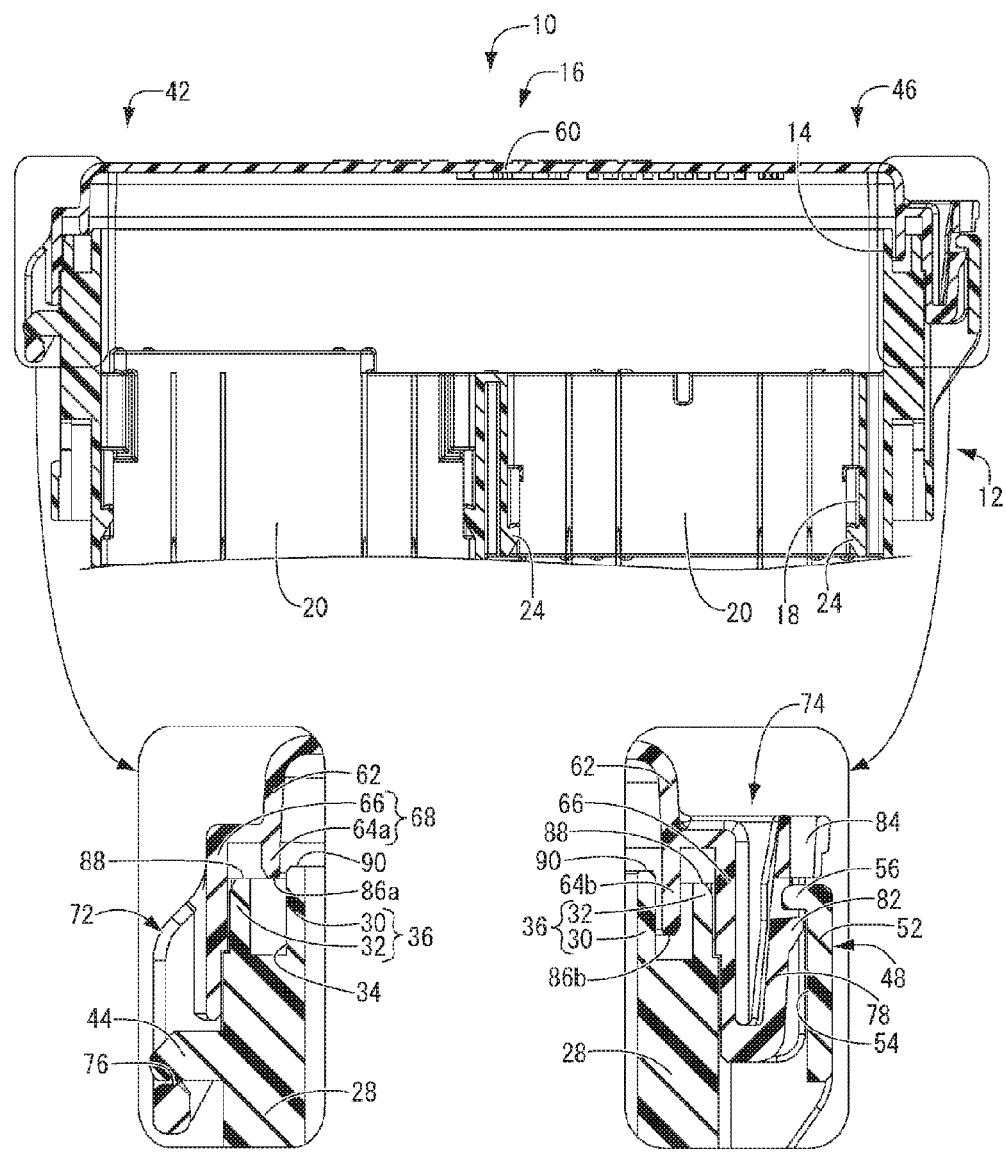
FIG. 5 is a cross-sectional view taken along line V-V in FIG. 4.
Figure 6:
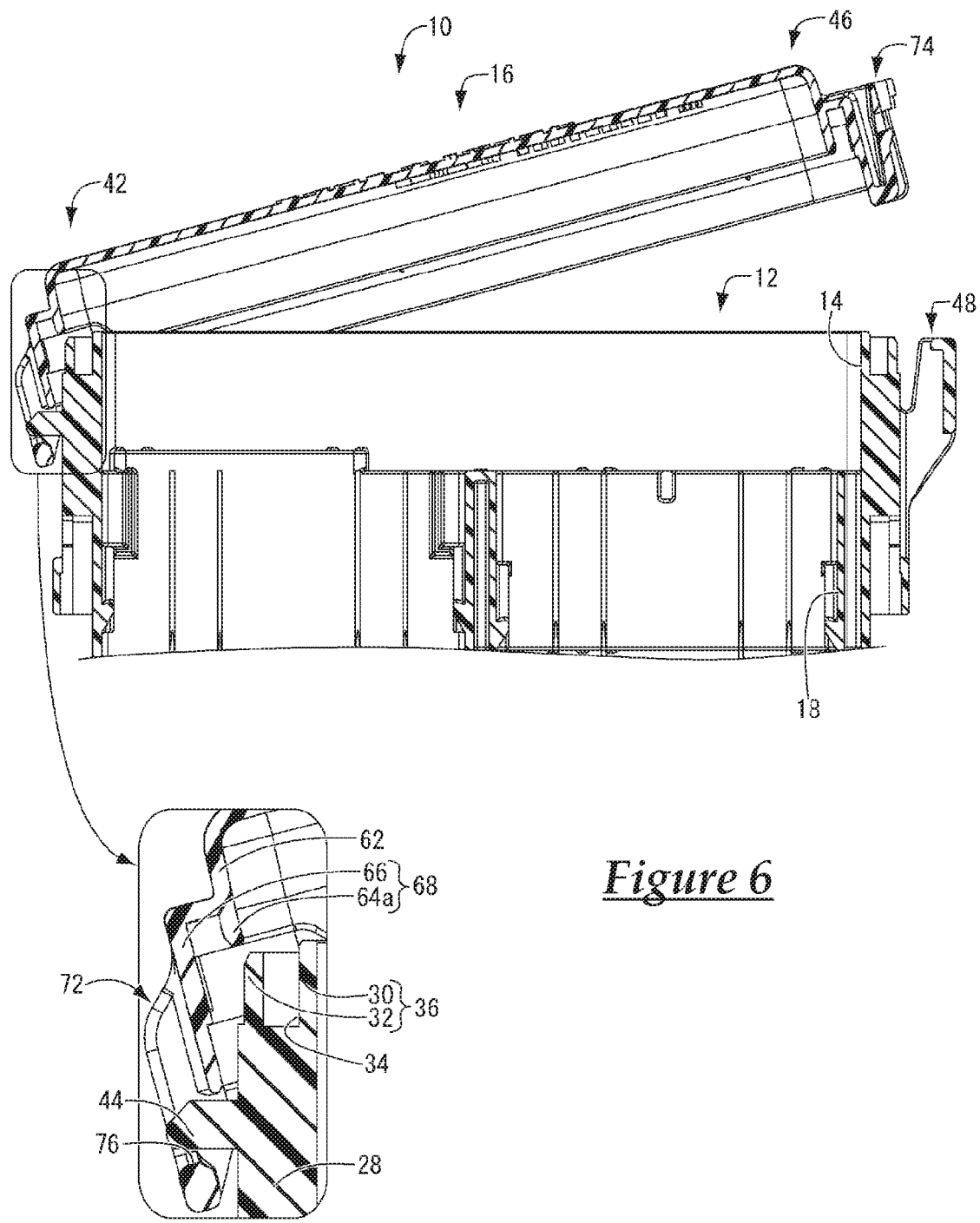
FIG. 6 is a cross-sectional view illustrating a state in which the upper cover is being rotated and attached to the box body, and corresponds to FIG. 5.
Figure 7:
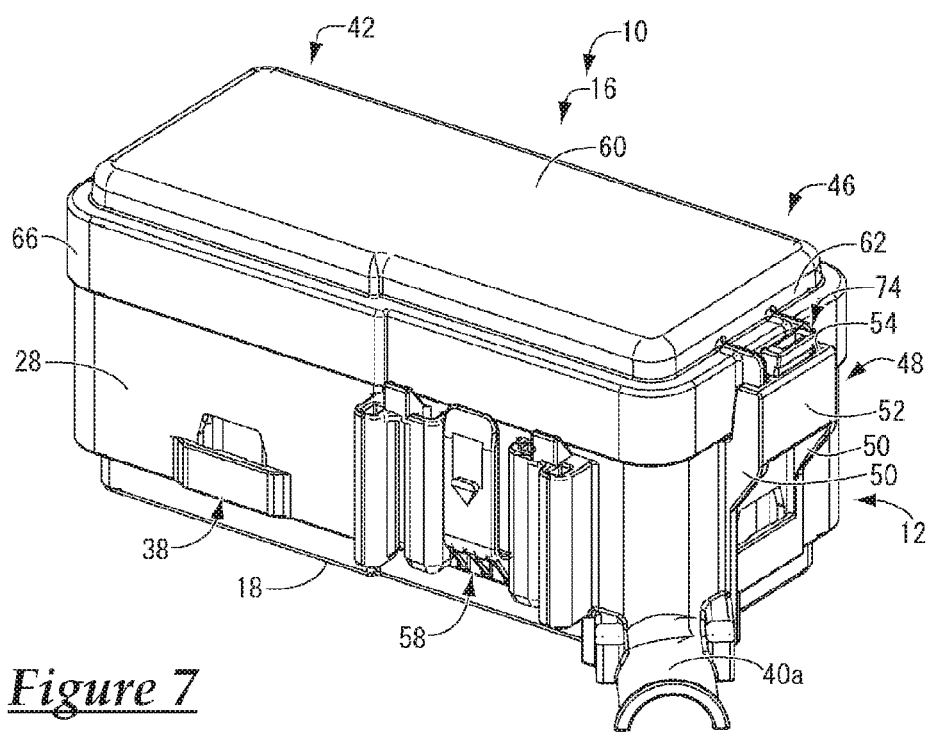
FIG. 7 is a perspective view of the electrical junction box shown in FIG. 1, as viewed in another direction.

When the upper cover 16 configured in this manner is attached to the upper opening portion 14 of the box body 12, first, as shown in FIG. 6, the engaged portion 44 provided on the one end side 42 of the box body 12 is inserted into and engaged with the engaging hole 76 of the engaging portion 72 provided on the one end side 42 of the upper cover 16. Next, as shown in FIGS. 5 to 8, the upper cover 16 is rotated toward the box body 12 with the engaging portion 72 serving as the rotation center while the above state is maintained, and thus the upper cover 16 is attached to the box body 12 in the state in which the upper opening portion 14 of the box body 12 is covered with the upper cover 16. More specifically, first, the lower end portion of the locked portion 74 of the upper cover 16 is inserted into the accommodating portion 54 of the locking portion 48 of the box body 12 by rotating the upper cover 16. Then, by further rotating the upper cover 16, the guide plate portions 80 of the locked portion 74 of the upper cover 16 are guided by the guide portions 50 of the locking portion 48 of the box body 12, and the locked portion 74 of the upper cover 16 is inserted to the rear of the accommodating portion 54 of the locking portion 48 of the box body 12. When the elastic projecting piece 78 of the locked portion 74 is inserted into the accommodating portion 54, the engaging projection 82 of the elastic projecting piece 78 comes into contact with the engaging projection portion 56 of the locking portion 48 of the box body 12 and is bent and deformed inward, and thus the elastic projecting piece 78 is allowed to be further inserted into the accommodating portion 54. Subsequently, when the engaging projection 82 passes the engaging projection portion 56 so that the elastic projecting piece 78 is elastically restored, the engaging projection 82 is engaged with the lower end portion of the engaging projection portion 56, and thus the box body 12 and the upper cover 16 are fitted and locked to each other with a locking mechanism. In this manner, in this embodiment, the locking mechanism with which the box body 12 and the upper cover 16 are fitted and locked to each other includes the locking portion 48 of the box body 12 and the locked portion 74 of the upper cover 16, which are provided on the other end side 46, and the engaged portion 44 of the box body 12 and the engaging portion 72 of the upper cover 16, which are provided on the one end side 42. It should be noted that in a case where it is desired to release the lock, the upper opening portion 14 of the box body 12 can be uncovered by lifting the upper cover 16 upward while the engagement releasing portion 84 of the locked portion 74 of the upper cover 16 is being pressed.

In the state in which the box body 12 and the upper cover 16 are fitted to each other, on the one end side 42, the outer wall 32 of the box body 12 is located on the inner side with respect to the outer wall 66 of the upper cover 16, the inner wall 64a of the upper cover 16 is located on the inner side with respect to the outer wall 32 of the box body 12, and the inner wall 30 of the box body 12 is located on the inner side with respect to the inner wall 64a of the upper cover 16, as shown in FIG. 5. The position of a projecting end surface 86a of the inner wall 64a of the upper cover 16 is set to be substantially as high as the position of a projecting end surface 88 of the outer wall 32 of the box body 12, and the position of the projecting end surface 90 of the inner wall 30 of the box body 12 is set to be higher than the position of the projecting end surface 86a of the inner wall 64a of the upper cover 16. As a result, the position of the projecting end surface 90 of the inner wall 30 of the box body 12 is higher than the position of the projecting end surface 88 of the outer wall 32 of the box body 12.

On the other hand, in the state in which the box body 12 and the upper cover 16 are fitted to each other, in a region other than the region located on the one end side 42 where the interference between the inner wall 64 of the upper cover 16 and the outer wall 32 of the box body 12 is not problematic, that is, for example, in a region on the other end side 46, the position of the projecting end surface 86b of the inner wall 64b of the upper cover 16 is set to be lower than the position of the projecting end surface 88 of the outer wall 32 of the box body 12, as shown in FIG. 5.

With the electrical junction box 10 according to this embodiment configured to have this structure, in the state in which the box body 12 and the upper cover 16 are fitted to each other, on the one end side 42, the position of the projecting end surface 86a of the inner wall 64a of the upper cover 16 is set to be substantially as high as the position of a projecting end surface 88 of the outer wall 32 of the box body 12. Accordingly, as shown in FIG. 6, when the upper cover 16 is rotated with the engaging portion 72 of the upper cover 16 serving as the rotation center, the interference between the inner wall 64a of the upper cover 16 and the outer wall 32 of the box body 12 can be reliably prevented. Therefore, it is possible to suppress the expansion of the electrical junction box 10 toward the outer peripheral side to avoid the increase in size of the electrical junction box 10 compared with the conventional structure in which a large clearance is secured between the outer wall 32 of the box body 12 and the inner wall 64a of the upper cover 16 on the one end side 42 to prevent the interference.

Furthermore, the position of the projecting end surface 90 of the inner wall 30 of the box body 12 is set to be higher than the position of the projecting end surface 86a of the inner wall 64a of the upper cover 16. This makes it possible to prevent water that has passed the inner wall 64a of the upper cover 16 and infiltrated into the inside from passing the inner wall 30 of the box body 12 and infiltrating into the inside of the electrical junction box 10. Therefore, the waterproof property of the electrical junction box 10 is improved more advantageously.

In addition, the position of the projecting end surface 90 of the inner wall 30 of the box body 12 is higher than the position of the projecting end surface 88 of the outer wall 32 of the box body 12, and therefore, even when water infiltrates through the clearance between the outer wall 66 of the upper cover 16 and the outer wall 32 of the box body 12, the water can be advantageously prevented from passing the inner wall 30 of the box body 12 and infiltrating into the inside of the electrical junction box 10. Moreover, the water flows down along the outer surface of the inner wall 30 of the box body 12 and thus can be quickly drained to the outside, and therefore, water can be reliably prevented from infiltrating into the inside of the electrical junction box 10.

In addition, in the state in which the box body 12 and the upper cover 16 are fitted to each other, a region other than the region located on the one end side 42 where the interference between the inner wall 64 of the upper cover 16 and the outer wall 32 of the box body 12 is not problematic is configured such that the position of the projecting end surface 86b of the inner wall 64b of the upper cover 16 is lower than the position of the projecting end surface 88 of the outer wall 32 of the box body 12. In such a region, the inner wall 64b of the upper cover 16 can be fitted between the outer wall 32 and the inner wall 30 in the double wall portion 36 of the box body 12, and thus the upper opening portion 14 of the box body 12 can be stably covered with the upper cover 16.

Although the embodiment of the present design has been described in detail, the present invention is not limited to the specific description. For example, there is no particular limitation on the specific shapes of the locking portion 48, the locked portion 74, the engaging portion 72, and the engaged portion 44, which are included in the locking mechanism, and their shapes can be set as desired considering the shape of the electrical junction box 10 and the like. Although this embodiment is configured such that the position of the projecting end surface 86b of the inner wall 64b of the upper cover 16 is lower than the position of the projecting end surface 88 of the outer wall 32 of the box body 12 in the entire region other than the region located on the one end side 42, if such a configuration is applied to at least a portion of the region other than the region on the one end side 42, the upper opening portion 14 of the box body 12 can be more stably covered with the upper cover 16.

Furthermore, although the position of the projecting end surface 86a of the inner wall 64a of the upper cover 16 is set to be substantially as high as the position of the projecting end surface 88 of the outer wall 32 of the box body 12 in this embodiment, the position of the projecting end surface 86*a* may be higher than the position of the projecting end surface 88. That is, if the position of the projecting end surface 86*a* of the inner wall 64*a* of the upper cover 16 is set to be as high as or higher than the position of the projecting end surface 88 of the outer wall 32 of the box body 12, when the upper cover 16 is rotated with the engaging portion 72 of the upper cover 16 serving as the rotation center, the interference between the inner wall 64*a* of the upper cover 16 and the outer wall 32 of the box body 12 can be reliably prevented. As a result, it is possible to avoid the increase in size of the electrical junction box 10 compared with the case where the interference is prevented by increasing the size of the clearance between the outer wall 32 of the box body 12 and the inner wall 64*a* of the upper cover 16 as in a conventional structure.

REFERENCE SIGNS LIST

10: electrical junction box; 12: box body; 14: upper opening portion; 16: upper cover; 28: peripheral wall (box body); 30: inner wall; 32: outer wall; 34: clearance; 36: double wall portion; 42: one end side; 44: engaged portion; 62: peripheral wall (upper cover); 64, 64*ab*: inner wall; 66: outer wall; 67: clearance; 68: double wall portion; 72: engaging portion; 86*ab*: projecting end surface (inner wall of upper cover); 88: projecting end surface (outer wall of box body); 90: projecting end surface (inner wall of box body).

The invention claimed is:

1. An electrical junction box comprising:
   a box body having a peripheral wall formed in a frame shape; and
   an upper cover with which an upper opening portion of the box body is covered,
   an upper end portion of the peripheral wall of the box body and an opening end portion of the upper cover being provided with double wall portions in which an inner wall and an outer wall extending in a peripheral direction are arranged with a clearance therebetween,
   the upper cover being attached to the box body by engaging an engaging portion provided on one end side of the upper cover with an engaged portion provided on one end side of the box body and rotating the upper cover with the engaging portion serving as a rotation center,
   wherein, in a state in which the upper cover is attached to the box body, on the one end side of the box body and the one end side of the upper cover, the outer wall of the box body is located on an inner side with respect to the outer wall of the upper cover, the inner wall of the upper cover is located on an inner side with respect to the outer wall of the box body, and the inner wall of the box body is located on an inner side with respect to the inner wall of the upper cover, and
   a position of a projecting end surface of the inner wall of the upper cover is set to be as high as or higher than a position of a projecting end surface of the outer wall of the box body, and a position of a projecting end surface of the inner wall of the box body is set to be higher than the position of the projecting end surface of the inner wall of the upper cover.

2. The electrical junction box according to claim 1,
   wherein, in at least a portion of a region other than a region on the one end side, in the state in which the upper cover is attached to the box body, the position of the projecting end surface of the inner wall of the upper cover is set to be lower than the position of the projecting end surface of the outer wall of the box body.

\* \* \* \* \*